US012028875B2

(12) United States Patent
Zhou et al.

(10) Patent No.: US 12,028,875 B2
(45) Date of Patent: Jul. 2, 2024

(54) PHYSICAL DOWNLINK CONTROL CHANNEL BLIND DETECTION METHOD, USER EQUIPMENT AND READABLE STORAGE MEDIUM

(71) Applicant: BEIJING UNISOC COMMUNICATIONS TECHNOLOGY CO., LTD., Beijing (CN)

(72) Inventors: Huan Zhou, Shanghai (CN); Hualei Wang, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 365 days.

(21) Appl. No.: 17/568,859

(22) Filed: Jan. 5, 2022

(65) Prior Publication Data

US 2022/0149981 A1 May 12, 2022

Related U.S. Application Data

(63) Continuation of application No. PCT/CN2020/086936, filed on Apr. 26, 2020.

(30) Foreign Application Priority Data

Jul. 5, 2019 (CN) .......................... 201910604718.4

(51) Int. Cl.
*H04L 1/00* (2006.01)
*H04L 5/00* (2006.01)
(Continued)

(52) U.S. Cl.
CPC ......... *H04W 72/231* (2023.01); *H04L 1/0038* (2013.01); *H04L 5/0007* (2013.01);
(Continued)

(58) Field of Classification Search
CPC ....... H04L 1/0001–0077; H04L 5/0001–0098; H04W 72/02–569; H04W 84/02–16;
(Continued)

(56) References Cited

U.S. PATENT DOCUMENTS

| 2013/0107822 A1 | 5/2013 | Papasakellariou et al. |
| 2018/0110045 A1 | 4/2018 | You et al. |

(Continued)

FOREIGN PATENT DOCUMENTS

| CN | 102215586 A | 10/2011 |
| CN | 106549738 A | 3/2017 |

(Continued)

OTHER PUBLICATIONS

Hisilicon, "Sidelink physical layer procedures for NR V2X", 3GPP TSG RAN WG1 Meeting #97; R1 1906008; May 13-17, 2019; 24 pages.

(Continued)

*Primary Examiner* — Timothy J Weidner
(74) *Attorney, Agent, or Firm* — CANTOR COLBURN LLP

(57) ABSTRACT

A physical downlink control channel blind detection method, a user equipment and a readable storage medium are provided. The method includes: receiving an issued first Radio Resource Control (RRC) signaling to determine an Aggregation Level (AL) of the PDCCH; receiving an issued second RRC signaling; determining a specific position of each CCE in the CORESET based on the configuration information in the second RRC signaling; determining positions of all PDCCH candidates, and obtaining a target PDCCH by blindly detecting the PDCCH; and obtaining a mapping position of a Downlink Control Information (DCI)

(Continued)

corresponding to a UE at a time domain sampling point by blindly detecting the time domain sampling based on the target PDCCH.

18 Claims, 2 Drawing Sheets

(51) Int. Cl.
*H04W 72/044* (2023.01)
*H04W 72/0446* (2023.01)
*H04W 72/0453* (2023.01)
*H04W 72/23* (2023.01)
*H04W 72/231* (2023.01)
*H04W 72/232* (2023.01)
*H04W 84/02* (2009.01)
*H04W 88/02* (2009.01)
*H04W 88/08* (2009.01)
*H04W 92/10* (2009.01)

(52) U.S. Cl.
CPC ..... *H04W 72/044* (2013.01); *H04W 72/0446* (2013.01); *H04W 72/0453* (2013.01); *H04W 72/23* (2023.01); *H04W 72/232* (2023.01); H04W 84/02 (2013.01); H04W 88/02 (2013.01); H04W 88/08 (2013.01); *H04W 92/10* (2013.01)

(58) Field of Classification Search
CPC ..... H04W 88/02–12; H04W 92/02–04; H04W 92/10
See application file for complete search history.

(56) References Cited

U.S. PATENT DOCUMENTS

| | | |
|---|---|---|
| 2018/0205522 A1 | 7/2018 | Wang et al. |
| 2019/0082427 A1 | 3/2019 | Kim et al. |
| 2020/0092866 A1 | 3/2020 | Xue et al. |
| 2020/0196285 A1 | 6/2020 | Zhuang et al. |
| 2020/0204294 A1 | 6/2020 | Ma et al. |
| 2020/0244393 A1 | 7/2020 | Zhang et al. |
| 2021/0037506 A1 | 2/2021 | Yoshimura et al. |

FOREIGN PATENT DOCUMENTS

| | | |
|---|---|---|
| CN | 107690762 A | 2/2018 |
| CN | 108833069 A | 11/2018 |
| CN | 109152050 A | 1/2019 |
| CN | 109474384 A | 3/2019 |
| CN | 109495234 A | 3/2019 |
| CN | 109511169 A | 3/2019 |
| CN | 109587791 A | 4/2019 |
| CN | 109660315 A | 4/2019 |
| CN | 109699054 A | 4/2019 |
| CN | 109699076 A | 4/2019 |
| WO | 2019049559 A1 | 3/2019 |
| WO | 2019108623 A1 | 6/2019 |

OTHER PUBLICATIONS

International Search Report for International Application No. PCT/CN2020/086936; dated Jun. 1, 2020.
ZTE, "Search space design and related issues", 3GPP TSG RAN WG1 Meeting AH 1801; R1-1800130; Jan. 22-26, 2018; 9 pages.

PHYSICAL DOWNLINK CONTROL CHANNEL BLIND DETECTION METHOD, USER EQUIPMENT AND READABLE STORAGE MEDIUM

CROSS-REFERENCE TO RELATED APPLICATIONS

This application is a continuation under 35 U.S.C. § 120 of International Application No. PCT/CN2020/086936, filed on Apr. 26, 2020, which claims priority to Chinese Patent Application No. 201910604718.4, filed on Jul. 5, 2019, and entitled "PHYSICAL DOWNLINK CONTROL CHANNEL BLIND DETECTION METHOD, USER EQUIPMENT AND READABLE STORAGE MEDIUM", the entire disclosure of which is incorporated herein by reference.

TECHNICAL FIELD

The present disclosure generally relates to wireless communication technology field, and more particularly, to a physical downlink control channel blind detection method, user equipment and readable storage medium.

BACKGROUND

In a New Radio (NR) system, a User Equipment (UE) need to obtain a Downlink Control Information (DCI) configured by a great NodeB (gNB), the DCI is carried by a Physical Downlink Control Channel (PDCCH).

One PDCCH is form of an aggregation of 1, 2, 4, 8, 16, 32, 64, etc. number of continuous Control Channel Elements (CCE), and an Aggregation Level (AL) of the PDCCH represents a number of CCE that aggregate to form the PDCCH. A UE performs a blind detection of a DCI in a Control-Resource Set (CORESET). One CORESET is associated with one or multiple search space, one search space includes a set of PDCCH to be detected by the UE, and one DCI is contained in one CORESET.

In an ultra-high frequency band or a satellite communication, due to a low efficiency of a power amplifier, a lower peak-to-average ratio (PARP) waveform is necessarily introduced to reduce the loss of the power amplifier. A DFT-S-OFDM waveform is an optional single carrier waveform, and a downlink channel and a downlink signal are time-division multiplexed when using the DFT-S-OFDM waveform. A base station sends one or multiple PDCCHs at one monitoring occasion, and PDCCHs of all UEs is multiplexed together. Therefore, UE needs to find out its own PDCCH through a blind detection from all PDCCH candidates positions, which is relatively complicated.

SUMMARY

Embodiments of the present disclosure provide a method for reducing a complexity of blind detection of a PDCCH by a DFT-S-OFDM waveform.

In an embodiment of the present disclosure, a method for blindly detecting a Physical Downlink Control Channel (PDCCH) is provided, the method includes: receiving an issued first Radio Resource Control (RRC) signaling to determine an Aggregation Level (AL) of the PDCCH; receiving an issued second RRC signaling, wherein the second RRC signaling includes following configuration information: a number of Resource Blocks (RB) in a frequency domain corresponding to a Control-Resource Set (CORESET), lengths of RBs, starting positions of the RBs and a number of Control Channel Elements (CCE); determining a specific position of each CCE in the CORESET based on the configuration information in the second RRC signaling; determining positions of all PDCCH candidates, and obtaining a target PDCCH by blindly detecting the PDCCH; wherein a position of a PDCCH candidate includes a starting position of the PDCCH candidate and the AL of the PDCCH, and the starting position of the PDCCH candidate includes a starting position of the first CCE; and obtaining a mapping position of a Downlink Control Information (DCI) corresponding to a UE at a time domain sampling point by blindly detecting the time domain sampling based on the target PDCCH.

In an embodiment of the present disclosure, a User Equipment (UE) is provided, the UE includes: a first determining circuitry, adapted to determine an Aggregation Level (AL) of a Physical Downlink Control Channel (PDCCH) based on a receiving first Radio Resource Control (RRC) signaling; a receiving circuitry, adapted to receive an issued second RRC signaling, wherein the second RRC signaling includes following configuration information: a number of Resource Blocks (RB) in a frequency domain corresponding to a Control-Resource Set (CORESET), lengths of RBs, starting positions of the RBs and a number of Control Channel Elements (CCE); a second determining circuitry, adapted to determine a specific positions of each CCE in the CORESET based on the configuration information in the second RRC signaling; a first obtaining circuitry, adapted to determine positions of all PDCCH candidates, and obtain a target PDCCH by blindly detecting the PDCCH; wherein a position of a PDCCH candidate includes a starting position of the PDCCH candidate and the AL of the PDCCH, and the starting position of the PDCCH candidate includes a starting position of the first CCE; and a second obtaining circuitry, adapted to obtain a mapping position of a Downlink Control Information (DCI) corresponding to the UE at a time domain sampling point by blindly detecting the time domain sampling based on the target PDCCH.

In an embodiment of the present disclosure, a non-transitory computer-readable storage medium storing one or more programs, the one or more programs includes computer instructions, which, when executed by a processor, cause the processor to: receive an issued first Radio Resource Control (RRC) signaling to determine an Aggregation Level (AL) of the PDCCH; receive an issued second RRC signaling, wherein the second RRC signaling includes following configuration information: a number of Resource Blocks (RB) in a frequency domain corresponding to a Control-Resource Set (CORESET), lengths of RBs, starting positions of RBs and a number of Control Channel Elements (CCE); determine a specific position of each CCE in the CORESET based on the configuration information in the second RRC signaling; determine positions of all PDCCH candidates, and obtain a target PDCCH by blindly detecting the PDCCH; wherein a position of a PDCCH candidate includes a starting position of the PDCCH candidate and the AL of the PDCCH, and the starting position of the PDCCH candidate includes a starting position of the first CCE; and obtain a mapping position of a Downlink Control Information (DCI) corresponding to the UE at a time domain sampling point by blindly detecting the time domain sampling based on the target PDCCH.

DETAILED DESCRIPTION

In an existing technology, a UE needs to find out its own PDCCH through a blind detection from all PDCCH candidates positions, which is rather complicated.

According to embodiments of the present disclosure, a UE can obtain a configuration information from a RRC signaling and determine specific position of each CCE in a CORESET, and thus determines positions of PDCCH candidates. The UE blindly detects determined positions of PDCCH candidates to obtain a target PDCCH. When the UE blindly detecting the PDCCH, the blind detection starts from a first CCE of the CORESET to a last CCE of the CORESET, which reduces complexity of blind detection of a PDCCH effectively.

In order to clarify the object, characteristic and advantages of embodiments of the present disclosure, the embodiments of present disclosure will be described clearly in detail in conjunction with accompanying drawings.

Figure 1:
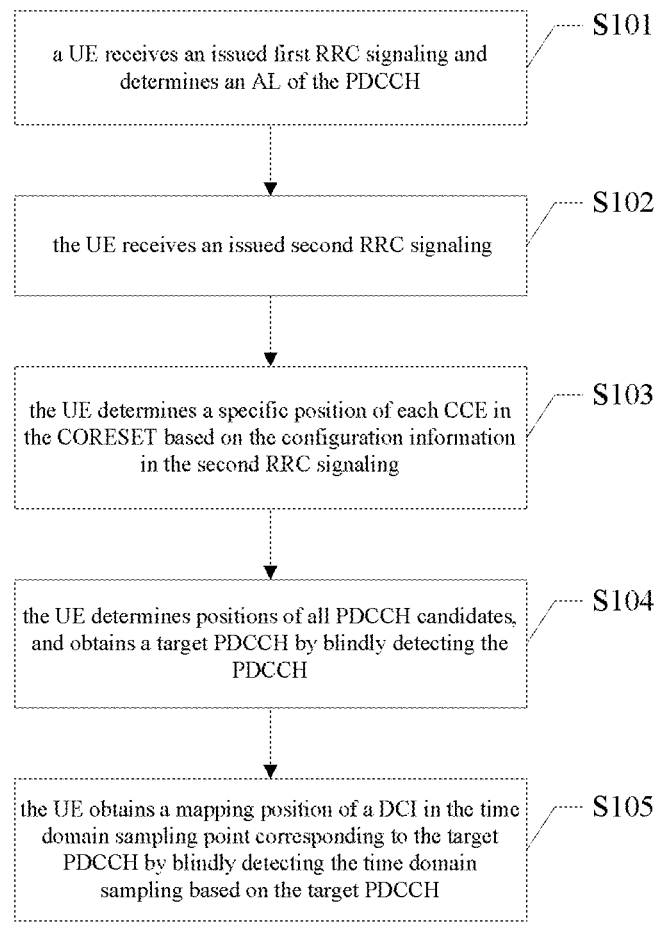
FIG. 1 schematically illustrates a flowchart of a method for blindly detecting a PDCCH according to an embodiment of the present disclosure.

According to embodiments of the present disclosure, a method for blindly detecting a PDCCH is provided. Referring to FIG. 1, the method may include the following S101, S102, S103, S104, and S105. The method may be performed by a UE, and the UE in embodiments of the present disclosure may refer to various forms of UEs, access terminals, user units, user stations, Mobile Stations (MS), remote stations, remote terminals and the like, which is not limited in embodiments of the present disclosure.

In S101, a UE receives an issued first RRC signaling and determines an AL of the PDCCH.

In some embodiment, one PDCCH can be formed of an aggregation of 1, 2, 4, 8, 16, 32, 64, etc. number of continuous CCEs, the AL of the PDCCH represents the number of CCE that aggregate to form the PDCCH. Each AL corresponds to one search space, and the one search space includes a set of PDCCHs to be detected by the UE.

In some embodiment, a base station may configure an AL of the PDCCH for a UE through a high-level signaling in advance. For an unlimited example, the base station configures the AL of the PDCCH for the UE through a RRC.

In some embodiment, a base station may agree the AL of the PDCCH with the UE in advance. Such that the UE can obtain the fixed AL of the PDCCH according to the predefined agreement.

In the embodiment of the present disclosure, the AL of the PDCCH may be a set, for example, the AL of the PDCCH may be {2,4,8,16,32}; or, the AL of the PDCCH may also be any one or more in the above set, for example, the AL of the PDCCH is 8.

In S102, the UE receives an issued second RRC signaling.

In some embodiment, a base station may issue the second RRC signaling to the UE. The second RRC signaling may include following configuration information: a number of Resource Blocks (RB) of a frequency domain corresponding to a CORESET, lengths of RBs, starting positions of RBs and a number of CCEs.

In S103, the UE determines a specific position of each CCE in the CORESET based on the configuration information in the second RRC signaling.

In some embodiment, the UE may determine the specific positions of each CCE in the CORESET once a number of RBs of a frequency domain corresponding to a CORESET, lengths of the RBs, starting positions of RBs and a number of CCEs are obtained.

In some embodiment, a starting position of a RB includes an offset position relative to a preset reference point, that is, the starting position of the RB may be indicated implicitly. The preset reference point may be a preset common reference point, or may be a starting subcarrier position in the CORESET, or may be a starting subcarrier position of a Band Width Part (BWP).

In S104, the UE determines positions of all PDCCH candidates, and obtains a target PDCCH by blindly detecting the PDCCH.

In some embodiment, the obtained position of PDCCH candidate may include a starting position of the PDCCH candidate and the AL of the PDCCH. After obtaining the starting position of the PDCCH candidate and the AL of the PDCCH, the UE may obtain an ending position of the PDCCH candidate. According to the embodiment of the present disclosure, the starting position of the PDCCH candidate includes a starting position of the first CCE in the CORESET, and the ending position of the PDCCH candidate includes an ending position of the last CCE in the CORESET.

In some embodiment, for PDCCHs with different ALs, when blindly detecting the PDCCH, the blind detections start from the starting position of the PDCCH candidate to the ending position of the PDCCH candidate. That is to say, for PDCCHs with different ALs, when blindly detecting the PDCCH, the blind detections start from the CCE 0 in the CORESET to the CCE L-1 in the CORESET.

For a maximum AL Lmax, positions of PDCCH candidates corresponding to the Lmax are: CCE 0 to CCE Lmax-1.

For example, the maximum AL Lmax is 32, positions of corresponding PDCCH candidates are: CCE 0 to CCE31.

In some embodiment, following hash function value can be used to determine the positions of PDCCH candidates:

$$L \cdot \left\{ \left( Y_{p,n_{s,f}^{\mu}} \right) \bmod \lfloor N_{CCE,p} / L \rfloor \right\} + i; \quad (1)$$

Wherein, L represents the AL of the PDCCH, $$Y_{p,n_{s,f}^{\mu}}$$

represents a cell ID or N, and N is a non-negative integer, the cell ID is an identity of a currently camping cell, $N_{CCE,p}$ represents the number of the CCE in the CORESET, L represents the AL, $\lfloor N_{CCE,p}/L \rfloor$ represents a result of rounding down of $N_{CCE,p}/L$, $$\left( Y_{p,n_{s,f}^{\mu}} \right) \bmod \lfloor N_{CCE,p} / L \rfloor$$

is a reminder obtained by dividing $$\left( Y_{p,n_{s,f}^{\mu}} \right)$$

by $\lfloor N_{CCE,p}/L \rfloor$, and i is an integer and $0 \le i \le L-1$.

In some embodiment, positions of PDCCH candidates corresponding to different PDCCH ALs can be calculated using the above formula (1).

In some embodiment, positions of PDCCH candidates start from the starting position of the possible CCE corresponding to the maximum AL. In a practical application, a number of the CCE in the CORESET may be greater than the maximum AL. In that case, the starting positions of the PDCCH candidates and the ending position of the blind detection can be determined based on the hash function values, the AL, and the number of the CCE in the CORESET.

For example, the number of the CCE on the CORESET is 64, and the AL is 32, therefore, there are two possibilities for the position of the PDCCH. So the hash function values can be used to determine that the starting position of the PDCCH candidate is CCE 0 and the ending position of the PDCCH candidate is CCE 31, or the starting position of the PDCCH candidate is CCE 32 and the ending position of the PDCCH candidate is CCE 63.

Different from the existing technology, in the embodiment of the present disclosure, in S102, in addition to the number of RB, the length of the RB, the starting position of the RB of the frequency domain and the number of CCE, the RRC signaling, the configuration information obtained by the UE are contained with following information: a number of sample per time domain symbol, and information on the time domain symbol.

According to the embodiment of the present disclosure, the number of sample per time domain symbol may be used to obtain a frequency domain symbol and a position of the frequency domain symbol, that is, an output from a discrete Fourier transform is obtained, to obtain a multiplexed PDCCH; the information on the time domain symbol may be used to obtain a time domain sample and a position of the time domain symbol before the Fourier transformation, to obtain a PDCCH of the UE from the multiplexed PDCCH.

In the embodiment of the present disclosure, the CORESET is formed of one or more PDCCH resource sets, specifically a candidate frequency domain and time domain symbol resource set, or a time domain sampling point set. One CORESET includes a plurality of CCEs, one CCE includes a plurality of continuous Resource Element Groups (REGs), and the plurality of REGs are continuously mapped in the time domain, include two time domain dimensions such as time domain sampling points and time domain symbols. Each REG among the plurality of REGs includes a plurality of continuous Resource Elements (REs) in one time domain symbol, or includes a plurality of continuous time domain sampling points in one time domain symbol.

According to the embodiment of the present disclosure, the plurality of CCEs may be aggregated into one PDCCH candidate for a PDCCH search. The DCI is carried by one PDCCH candidate, and the base station can adaptively select an AL of the PDCCH candidate based on a channel state.

In some embodiment, after obtaining the target PDCCH by blind detection, the UE can obtain a mapping position of a DCI in the time domain sampling point corresponding to the UE from the target PDCCH.

In the embodiment of the present disclosure, the UE may determine a set of the time domain sampling point corresponding to the target PDCCH based on the target PDCCH; the UE may determine a starting position of the CCE of the time domain sampling point corresponding to the target PDCCH based on the set of the time domain sampling point corresponding to the target PDCCH; the UE may determine an AL of and a number of the times domain sampling point candidate for each time domain sampling point candidate corresponding to the UE based on an AL of the time domain sampling point corresponding to the target PDCCH; and the UE may determine a mapping position of the DCI corresponding to the UE at the time domain sampling point, based on the starting position of the CCE of the time domain sampling point corresponding to the target PDCCH, and the AL of and the number of times of the blind detection for the time domain sampling point candidate.

When the UE detects an AL of the time domain sampling point candidate corresponding to the UE, the UE can calculate the number of the blind detection corresponding to an AL of each time domain sampling point candidate based on the AL of each time domain sampling point candidate corresponding to the target PDCCH. And the UE can determine that the AL of each time domain sampling point candidate being not greater than the AL of the time domain sampling point corresponding to the target PDCCH.

In the embodiment of the present disclosure, a number of times of blind detection corresponding to the AL of each time domain sampling point candidate can be determined by following formula: $BD=\min(B, Lr/l)$, wherein, Lr represents the AL corresponding to the target PDCCH, B represents a number of times of the blind detection corresponding to the AL of PDCCHs except for the PDCCH having the greatest AL configured in the second RRC signaling, l represents the AL of the time domain sampling point candidate, and l is less than or equal to Lr.

It can be seen that in the embodiment of the present disclosure, when the UE blindly detecting the PDCCH, the blind detection starts from the first CCE of the CORESET to the last CCE of the CORESET, which reduces complexity of blind detection of a PDCCH effectively.

Figure 2:
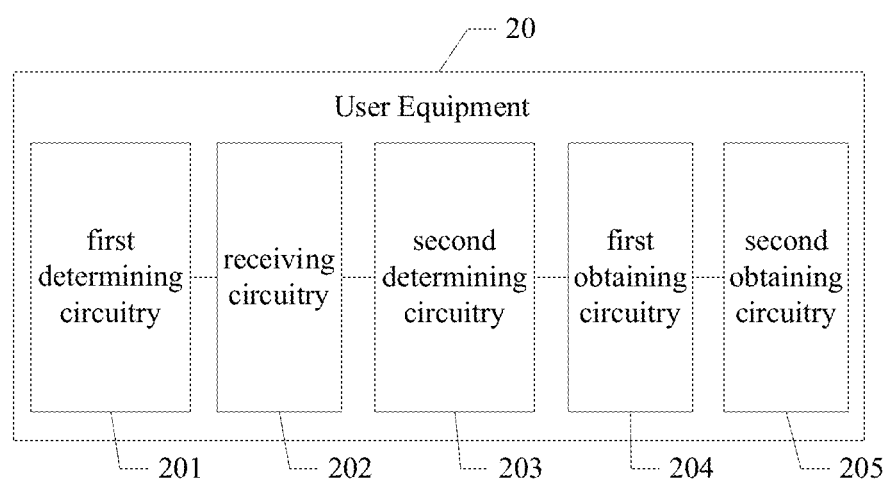
FIG. 2 schematically illustrates a schematic structural diagram of a user equipment according to an embodiment of the present disclosure.

Referring to FIG. 2, a UE according to an embodiment of the present disclosure is provided, includes: a first determining circuitry 201, a receiving circuitry 202, a second determining circuitry 203, a first obtaining circuitry 204 and a second obtaining circuitry 205.

Wherein, the first determining circuitry 201 is adapted to determine an AL of a PDCCH based on a receiving first RRC signaling.

The receiving circuitry 202 is adapted to receive an issued second RRC signaling, the second RRC signaling includes following configuration information: a number of RBs in a frequency domain corresponding to a CORESET, lengths of RBs, starting positions of the RBs and a number of CCEs.

The second determining circuitry 203 is adapted to determine a specific position of each CCE in the CORESET based on the configuration information in the second RRC signaling.

The first obtaining circuitry 204 is adapted to determine positions of all PDCCH candidates, and obtain a target PDCCH by blindly detecting the PDCCH; wherein a position of a PDCCH candidate includes a starting position of the PDCCH candidate and the AL of the PDCCH, and the starting position of the PDCCH candidates includes a starting position of the first CCE The second obtaining circuitry 205 is adapted to obtain a mapping position of a DCI corresponding to the UE at the time domain sampling point by blindly detecting the time domain sampling based on the target PDCCH.

In some embodiment, the starting position of the RB of the frequency domain includes an offset position relative to a preset reference point, and the preset reference point includes any of the following: a common reference point, a starting subcarrier position in the CORESET, and a starting subcarrier position of a BWP.

In some embodiment, the second determining circuitry 203 may determine the positions of all PDCCH candidates by following hash function values:

$$L \cdot \left\{ \left( Y_{p,n_{s,f}^\mu} \right) \mathrm{mod} \lfloor N_{CCE,p}/L \rfloor \right\} + i;$$

wherein, $$Y_{p,n_{s,f}^\mu}$$

represents a cell identifier (ID) or N, N≥0 and N is an integer, $N_{CCE,p}$ represents the number of the CCE in the CORESET, L represents the AL, $\lfloor N_{CCE,p}/L \rfloor$ represents a result of rounding down of $N_{CCE,p}/L$, the cell ID is an identity of a currently camping cell, and i is an integer and 0≤i≤L−1.

In some embodiment, the second determining circuitry 203 may determine the starting position of the PDCCH candidate based on the hash function values, the AL of the PDCCH and the number of the CCE in the CORESET.

In some embodiment, the second obtaining circuitry 205 may determine a set of time frequency domain resources of the time domain sampling point corresponding to the target PDCCH based on the target PDCCH; determine a starting position of the CCE of the time domain sampling points corresponding to the target PDCCH based on the set of the time domain sampling points corresponding to the target PDCCH; determine an AL of and a number of times of blind detection for each time domain sampling point candidate corresponding to the UE based on an AL of the time domain sampling point corresponding to the target PDCCH; and determine a mapping position of the DCI corresponding to the UE at the time domain sampling point, based on the starting position of the CCE of the time domain sampling point corresponding to the target PDCCH, and the AL of and the number of times of the blind detection for the time domain sampling point candidate.

In some embodiment, the second obtaining circuitry 205 may determine the AL of each time domain sampling point candidate being not greater than the AL of the time domain sampling point corresponding to the target PDCCH; and determine a number of times of blind detection corresponding to the AL of each time domain sampling point candidate by following formula: BD=min (B, Lr/l), wherein, Lr represents the AL corresponding to the target PDCCH, B represents a number of times of the blind detection corresponding to the AL of PDCCHs except for the PDCCH having the greatest AL configured in the second RRC signaling, l represents the AL of the time domain sampling point candidate, and l is less than or equal to Lr.

In an embodiment of the present disclosure, a computer-readable storage medium having computer instructions stored therein is provided, the computer-readable storage medium is a non-volatile storage medium or a non-transitory storage medium, wherein once the computer instructions are executed, the method as described above can be performed.

In an embodiment of the present disclosure, another user terminal including a memory and a processor is provided, wherein the memory has computer instructions stored therein, and the method as described above can be performed, once the processor executes the computer instructions.

Those skilled in the art can understand that all or part of the processes in the various methods of the above-mentioned embodiments can be completed by a program instructing relevant hardware. The program can be stored in any computer-readable storage medium, and the storage medium may include: ROM, RAM, magnetic disk or CD, etc.

Although the present disclosure is disclosed as above, the present disclosure is not limited to this. Those skilled in the art can make various changes and modifications without departing from the spirit and scope of the present disclosure. Therefore, the protection scope of the present disclosure should be subject to the scope defined by the claims.

What is claimed is:

1. A method for blindly detecting a Physical Downlink Control Channel (PDCCH), comprising:
    receiving an issued first Radio Resource Control (RRC) signaling to determine an Aggregation Level (AL) of the PDCCH;
    receiving an issued second RRC signaling, wherein the second RRC signaling comprises following configuration information: a number of Resource Blocks (RB) in a frequency domain corresponding to a Control-Resource Set (CORESET), lengths of RBs, starting positions of the RBs and a number of Control Channel Elements (CCE);
    determining a specific position of each CCE in the CORESET based on the configuration information in the second RRC signaling;
    determining positions of all PDCCH candidates, and obtaining a target PDCCH by blindly detecting the PDCCH; wherein a position of a PDCCH candidate comprises a starting position of the PDCCH candidate and the AL of the PDCCH, and the starting position of the PDCCH candidate comprises a starting position of the first CCE; and
    obtaining a mapping position of a Downlink Control Information (DCI) corresponding to a User Equipment (UE) at a time domain sampling point by blindly detecting the time domain sampling based on the target PDCCH, and.

2. The method according to claim 1, wherein said determining positions of all PDCCH candidates comprises: using following hash function values to determine positions of all PDCCH candidates:

$$L \cdot \left\{ \left( Y_{p,n_{s,f}^\mu} \right) \mathrm{mod} \lfloor N_{CCE,p}/L \rfloor \right\} + i;$$

wherein, $$Y_{p,n_{s,f}^\mu}$$

represents a cell identifier (ID) or N, N≥0 and N is an integer, $N_{CCE,p}$ represents the number of the CCE in the CORESET, L represents the AL, $\lfloor N_{CCE,p}/L \rfloor$ represents a result of rounding down of $N_{CCE,p}/L$, the cell ID is an identity of a currently camping cell, and i is an integer and 0≤i≤L−1.

3. The method according to claim 2, wherein said determining positions of all PDCCH candidates comprises:
    determining the starting position of PDCCH candidate based on the hash function values, the AL of the PDCCH, and the number of the CCE in the CORESET.

4. The method according to claim 1, wherein said obtaining a mapping position of a DCI corresponding to the UE at a time domain sampling point by blindly detecting the time domain sampling based on the target PDCCH comprises:
  determining a set of the time domain sampling point corresponding to the target PDCCH based on the target PDCCH;
  determining a starting position of the CCE of the time domain sampling point corresponding to the target PDCCH based on the set of the time domain sampling points corresponding to the target PDCCH;
  determining an AL of and a number of times of blind detection for each time domain sampling point candidate corresponding to the UE based on an AL of the time domain sampling point corresponding to the target PDCCH; and
  determining a mapping position of the DCI corresponding to the UE at the time domain sampling point, based on the starting position of the CCE of the time domain sampling point corresponding to the target PDCCH, and the AL of and the number of times of the blind detection for the time domain sampling point candidate.

5. The method according to claim 4, wherein said determining the AL of and the number of times of blind detection for each time domain sampling point candidate corresponding to the UE comprises:
  determining the AL of each time domain sampling point candidate being not greater than the AL of the time domain sampling point corresponding to the target PDCCH; and
  determining a number of times of blind detection corresponding to the AL of each time domain sampling point candidate by following formula: BD=min(B, Lr/l), wherein, Lr represents the AL corresponding to the target PDCCH, B represents a number of times of the blind detection corresponding to the AL of PDCCHs except for the PDCCH having the greatest AL configured in the second RRC signaling, l represents the AL of the time domain sampling point candidate, and l is less than or equal to Lr.

6. The method according to claim 1, wherein the starting position of the RB of the frequency domain comprises an offset position relative to a preset reference point, and the preset reference point comprises any of the following: a common reference point, a starting subcarrier position in the CORESET, and a starting subcarrier position of a Band Width Part (BWP).

7. A User Equipment (UE), comprising:
  a first determining circuitry, adapted to determine an Aggregation Level (AL) of a Physical Downlink Control Channel (PDCCH) based on a receiving first Radio Resource Control (RRC) signaling;
  a receiving circuitry, adapted to receive an issued second RRC signaling, wherein the second RRC signaling comprises following configuration information: a number of Resource Blocks (RB) in a frequency domain corresponding to a Control-Resource Set (CORESET), lengths of RBs, starting positions of the RBs and a number of Control Channel Elements (CCE);
  a second determining circuitry, adapted to determine a specific positions of each CCE in the CORESET based on the configuration information in the second RRC signaling;
  a first obtaining circuitry, adapted to determine positions of all PDCCH candidates, and obtain a target PDCCH by blindly detecting the PDCCH; wherein a position of a PDCCH candidate comprises a starting position of the PDCCH candidate and the AL of the PDCCH, and the starting position of the PDCCH candidate comprises a starting position of the first CCE; and
  a second obtaining circuitry, adapted to obtain a mapping position of a Downlink Control Information (DCI) corresponding to the UE at a time domain sampling point by blindly detecting the time domain sampling based on the target PDCCH, and.

8. The UE according to claim 7, wherein the second determining circuitry is adapted to determine the positions of all PDCCH candidates by following hash function values:

$$L \cdot \left\{ \left( Y_{p,n_{s,f}^\mu} \right) \bmod \lfloor N_{CCE,p} / L \rfloor \right\} + i;$$

wherein, $$Y_{p,n_{s,f}^\mu}$$

represents a cell identifier (ID) or N, N≥0 and N is an integer, $N_{CCE,p}$ represents the number of the CCE in the CORESET, L represents the AL, $\lfloor N_{CCE,p}/L \rfloor$ represents a result of rounding down of $N_{CCE,p}/L$, the cell ID is an identity of a currently camping cell, and i is an integer and 0≤i≤L−1.

9. The UE according to claim 8, wherein the second determining circuitry is adapted to determine the starting position of the PDCCH candidate based on the hash function values, the AL of the PDCCH, and the number of the CCE in the CORESET.

10. The UE according to claim 7, wherein the second obtaining circuitry is adapted to determine a set of the time domain sampling point corresponding to the target PDCCH based on the target PDCCH; determine a starting position of the CCE of the time domain sampling points corresponding to the target PDCCH based on the set of the time domain sampling points corresponding to the target PDCCH; determine an AL of and a number of times of blind detection for each time domain sampling point candidate corresponding to the UE based on an AL of the time domain sampling point corresponding to the target PDCCH; and determine a mapping position of the DCI corresponding to the UE at the time domain sampling point, based on the starting position of the CCE of the time domain sampling point corresponding to the target PDCCH, and the AL of and the number of times of the blind detection for the time domain sampling point candidate.

11. The UE according to claim 10, wherein the second obtaining circuitry is adapted to determine the AL of each time domain sampling point candidate being not greater than the AL of the time domain sampling point corresponding to the target PDCCH; and determine a number of times of blind detection corresponding to the AL of each time domain sampling point candidate by following formula: BD=min (B, Lr/l), wherein, Lr represents the AL corresponding to the target PDCCH, B represents a number of times of the blind detection corresponding to the AL of PDCCHs except for the PDCCH having the greatest AL configured in the second RRC signaling, l represents the AL of the time domain sampling point candidate, and l is less than or equal to Lr.

12. The UE according to claim 7, wherein the starting position of the RB of the frequency domain comprises an offset position relative to a preset reference point, and the preset reference point comprises any of the following: a common reference point, a starting subcarrier position in the CORESET, and a starting subcarrier position of a Band Width Part (BWP).

13. A non-transitory computer-readable storage medium storing one or more programs, the one or more programs comprising computer instructions, which, when executed by a processor, cause the processor to:
   receive an issued first Radio Resource Control (RRC) signaling to determine an Aggregation Level (AL) of the PDCCH;
   receive an issued second RRC signaling, wherein the second RRC signaling comprises following configuration information: a number of Resource Blocks (RB) in a frequency domain corresponding to a Control-Resource Set (CORESET), lengths of RBs, starting positions of RBs and a number of Control Channel Elements (CCE);
   determine a specific position of each CCE in the CORESET based on the configuration information in the second RRC signaling;
   determine positions of all PDCCH candidates, and obtain a target PDCCH by blindly detecting the PDCCH; wherein a position of a PDCCH candidate comprises a starting position of the PDCCH candidate and the AL of the PDCCH, and the starting position of the PDCCH candidate comprises a starting position of the first CCE; and
   obtain a mapping position of a Downlink Control Information (DCI) corresponding to a UE at a time domain sampling point by blindly detecting the time domain sampling based on the target PDCCH.

14. The non-transitory computer-readable storage medium according to claim 13, wherein said determining positions of all PDCCH candidates comprises: using following hash function values to determine positions of all PDCCH candidates:

$$L \cdot \left\{ \left( Y_{p,n_{s,f}^\mu} \right) \mathrm{mod} \lfloor N_{CCE,p} / L \rfloor \right\} + i;$$

wherein, $Y_{p,n_{s,f}^\mu}$ represents a cell identifier (ID) or N, N≥0 and N is an integer, $N_{CCE,p}$ represents the number of the CCE in the CORESET, L represents the AL, $\lfloor N_{CCE,p}/L \rfloor$ represents a result of rounding down of $N_{CCE,p}/L$, the cell ID is an identity of a currently camping cell, and i is an integer and 0≤i≤L−1.

15. The non-transitory computer-readable storage medium according to claim 14, wherein said determining positions of all PDCCH candidates comprises:
   determining the starting position of PDCCH candidate based on the hash function values, the AL of the PDCCH, and the number of the CCE in the CORESET.

16. The non-transitory computer-readable storage medium according to claim 13, wherein said obtaining a mapping position of a DCI corresponding to the UE at the time domain sampling point by blindly detecting the time domain sampling based on the target PDCCH comprises:
   determining a set of the time domain sampling point corresponding to the target PDCCH based on the target PDCCH;
   determining a starting position of the CCE of the time domain sampling point corresponding to the target PDCCH based on the set of the time domain sampling points corresponding to the target PDCCH;
   determining an AL of and a number of times of blind detection for each time domain sampling point candidate corresponding to the UE based on an AL of the time domain sampling point corresponding to the target PDCCH; and
   determining a mapping position of the DCI corresponding to the UE at the time domain sampling point, based on the starting position of the CCE of the time domain sampling point corresponding to the target PDCCH, and the AL of and the number of times of the blind detection for the time domain sampling point candidate.

17. The non-transitory computer-readable storage medium according to claim 16, wherein said determining the AL of and the number of times of blind detection for each time domain sampling point candidate corresponding to the UE comprises: determining the AL of each time domain sampling point candidate being not greater than the AL of the time domain sampling point corresponding to the target PDCCH; and
   determining a number of times of blind detection corresponding to the AL of each time domain sampling point candidate by following formula: BD=min(B, Lr/l), wherein, Lr represents the AL corresponding to the target PDCCH, B represents a number of times of the blind detection corresponding to the AL of PDCCHs except for the PDCCH having the greatest AL configured in the second RRC signaling, l represents the AL of the time domain sampling point candidate, and l is less than or equal to Lr.

18. The non-transitory computer-readable storage medium according to claim 13, wherein the starting position of the RB of the frequency domain comprises an offset position relative to a preset reference point, and the preset reference point comprises any of the following: a common reference point, a starting subcarrier position in the CORESET, and a starting subcarrier position of a Band Width Part (BWP).

* * * * *